(12) United States Patent
Nemeth

(10) Patent No.: US 10,827,745 B1
(45) Date of Patent: Nov. 10, 2020

(54) DUAL STAGE VITRIFICATION STICK

(71) Applicant: Lee L. Nemeth, Prospect, CT (US)

(72) Inventor: Lee L. Nemeth, Prospect, CT (US)

( * ) Notice: Subject to any disclaimer, the term of this patent is extended or adjusted under 35 U.S.C. 154(b) by 0 days.

(21) Appl. No.: 16/741,396

(22) Filed: Jan. 13, 2020

(51) Int. Cl.
*A01N 1/02* (2006.01)

(52) U.S. Cl.
CPC .................. *A01N 1/0268* (2013.01)

(58) Field of Classification Search
CPC .............. A01N 1/0268; A01N 1/0263; B01L 3/502715; B01L 7/50; B01L 7/52; B01L 2200/027; B01L 2300/0672; B01L 2300/0887; B01L 2300/047; B01L 2300/0816; B01L 2300/044; B01L 2400/0406; B01L 2400/0481; B01L 2400/0677; B01L 2400/0694; B01L 2400/086; B01L 2400/683; G01N 33/5005
See application file for complete search history.

(56) References Cited

U.S. PATENT DOCUMENTS

2004/0259072 A1* 12/2004 Kuwayama .............. A01N 1/02
   435/1.3
2008/0038155 A1  2/2008 Chian et al.
2010/0317108 A1  12/2010 Stojanov
2011/0129811 A1  6/2011 Tao
2011/0275153 A1  11/2011 Butler
2016/0174545 A1  6/2016 Parra et al.

OTHER PUBLICATIONS

U.S. Appl. No. 16/741,483, filed Jan. 13, 2020, Nemeth.
U.S. Appl. No. 29/720,442, filed Jan. 13, 2020, Nemeth.
Non-Final Office Action mailed by the USPTO dated Mar. 27, 2020 in U.S. Appl. No. 16/741,483.

* cited by examiner

*Primary Examiner* — Michael L Hobbs
(74) *Attorney, Agent, or Firm* — Ware, Fressola, Maguire & Barber LLP

(57) ABSTRACT

The present invention is directed to a vitrification stick for use in the cryopreservation of biological materials, and may include a body having a first portion and a second portion, a specimen end extending from the second portion of the body, and having a cavity defined therein, and a cap including an open end, a closed end, and an aperture, the cap being dimensioned so as to receive at least the specimen end. The cap is positionable relative to the second portion of the body between an open stage and a closed stage, and in the open stage the cavity of the specimen end is exposed by the aperture to an area exterior to the cap.

19 Claims, 14 Drawing Sheets

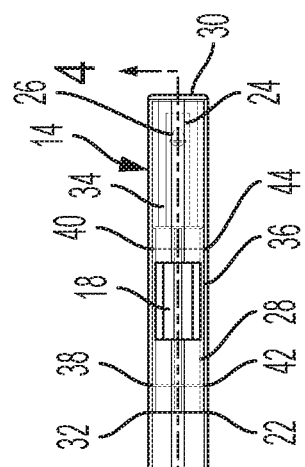
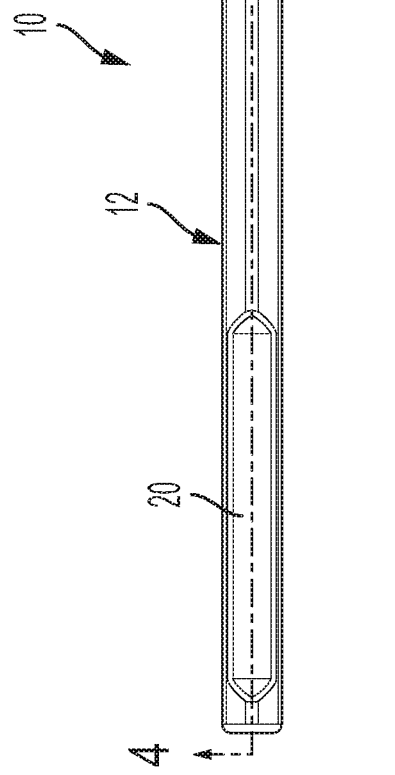

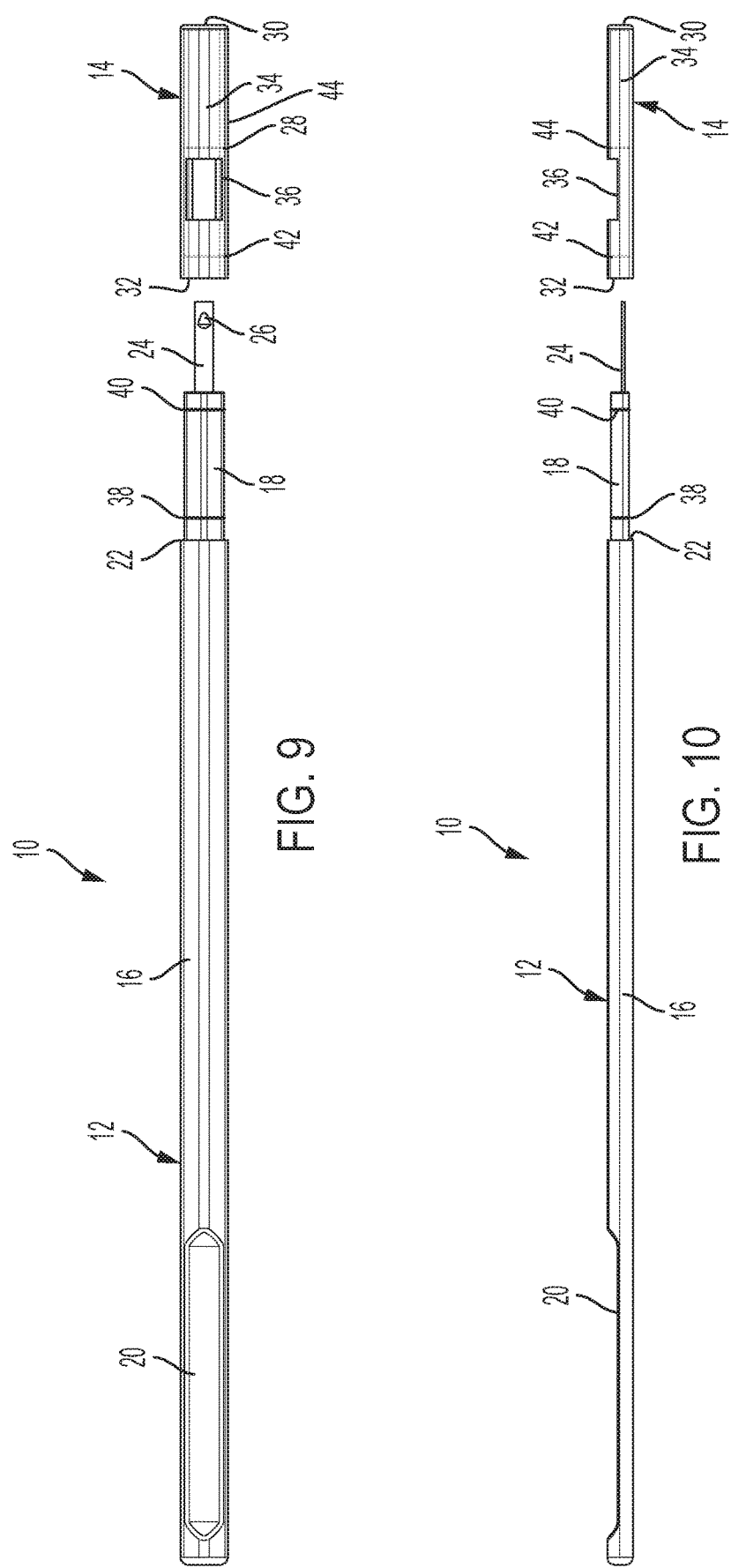

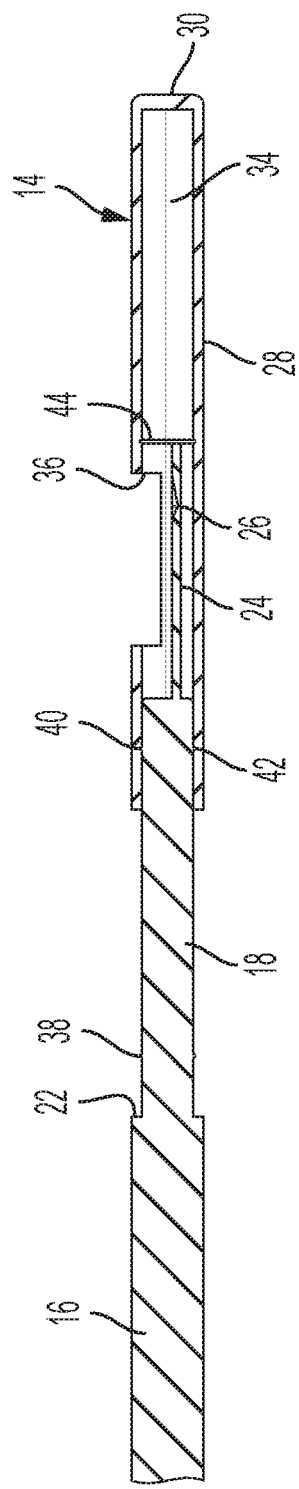

DUAL STAGE VITRIFICATION STICK

BACKGROUND OF THE INVENTION

1. Field of the Invention

The present invention is directed to vitrification sticks for use in cryopreservation, and more particularly to a vitrification stick with a dual stage closing mechanism for use in the cryopreservation of biological materials.

2. Description of Related Art

Cryopreservation involves the process of cooling biological materials, such as organelles, cell, tissues, embryos, extracellular matrix and/or organs, to very low temperatures, for example 77 Kelvin (−196° C.) using liquid nitrogen or 193 Kelvin (−80° C.) using dry ice (solid carbon dioxide). At such low temperatures, any biological and/or chemical activity that may cause damage to the biological material is effectively halted, thereby cryogenically preserving the biological material. One of the main purposes of cryopreservation is to allow for long term storage of biological materials. Such long term storage may include the storage of human or other animal egg cells or embryos for fertilization or implantation at a later time. However, for the purposes of cryopreservation it is necessary to reach low temperatures without causing damage to the biological materials through the formation of ice crystals. This may be accomplished through the use of cryoprotectants and/or rapid cooling of the biological materials to the desired cryopreservation temperature.

Vitrification involves the transformation of a solution comprised of a biological material, such as an egg or an embryo, into a glass-like amorphous solid that is free from any crystalline structure, followed by extremely rapid cooling. Successful vitrification requires preventing the formation of ice crystals within the intracellular liquid of the biological material. This may be accomplished by first dehydrating the biological material through the use of cryoprotectant fluids. The biological material may then be rapidly chilled by a cryogenic fluid such as liquid nitrogen. It is possible that multiple cryoprotectant fluids may need to be used in successive stages in order to effectively dehydrate the biological material without causing damage to the biological material. Furthermore, cryoprotectant fluids may be toxic to the biological materials prior to the vitrification of the biological material, and therefore, the time of exposure of the biological materials to the cryoprotectant fluids must be carefully controlled to avoid damage to the biological materials.

Currently, a biological material that is to be cryopreserved may be disposed upon a vitrification stick, and then the cryoprotectant fluid or series of cryoprotectant fluids may be administered to be biological material to allow for the vitrification process. However, this may be manually performed, and may expose the biological material to variances in procedure time and/or the risk that the biological material will become separated from the vitrification stick and thereby lost. The variances in the procedure time may increase the risk that the biological materials are damaged as a result of the cryopreservation process. Furthermore, during manual manipulation of the vitrification stick the biological material may become separated from the vitrification stick as a result of unintended jarring of the vitrification stick or passage of the cryoprotectant fluids over the biological material.

Therefore, there is a need for a vitrification stick that reduces the variables and opportunities for error that may occur during administration of the cryoprotectant fluids to the biological materials that are to be vitrified and cryopreserved.

SUMMARY OF THE INVENTION

The present invention is designed to overcome the above noted limitations that are attendant upon the use of conventional vitrification sticks and, toward this end, it contemplates the provision of a novel vitrification stick.

Accordingly, it is an object of the present invention to provide a vitrification stick for use in the cryopreservation of biological materials.

It is still another object of the present invention to provide a dual stage vitrification stick that is positionable between an open stage in which biological materials disposed on the vitrification stick are exposed, and a closed stage in which biological material disposed on the vitrification stick are at least substantially sealed within the vitrification stick.

It is another object of the present invention to provide a vitrification stick that can facilitate the application of cryoprotectants to biological materials.

It is yet another object of the present invention to provide a vitrification stick that assists in the secure retention of biological materials during the vitrification and cryopreservation processes.

It is still another object of the present invention to provide a vitrification stick that facilitates consistent processing times of biological materials for cryopreservation.

It is another object of the present invention to provide a vitrification stick that facilitates consistent application of cryoprotectants to biological materials.

It is yet another object of the present invention to provide a vitrification stick that allows cryoprotectants to be applied to biological materials while reducing the risk that the biological materials will become separated from the vitrification stick.

It is still another object of the present invention to provide a vitrification stick that allows for biological materials to be at least substantially sealed within the vitrification stick while reducing the risk that the biological materials will become separated from the vitrification stick.

It is another object of the present invention to provide a vitrification stick that facilitates long term cryogenic storage of biological materials.

In accordance with an exemplary embodiment of the present invention, a vitrification stick for use in the vitrification and cryopreservation of biological materials is provided that may include a body that may have a first portion and a second portion, a specimen end extending from the second portion of the body, and a cap that may include an open end, a closed end, and a plurality of walls defining a hollow interior chamber extending between the open end and the closed end.

In accordance with this and other exemplary embodiments of the present invention, the specimen end may have a cavity defined therein.

In accordance with this and other exemplary embodiments of the present invention, the cap may also include an aperture formed in at least one of the plurality of walls to the hollow interior chamber.

In accordance with this and other exemplary embodiments of the present invention, the cap may be dimensioned so as to receive the specimen end and at least a part of the second portion of the body.

In accordance with this and other exemplary embodiments of the present invention, the hollow interior chamber of the cap may have substantially the same cross-sectional size and shape as at least the part of the second portion of the body received within the cap.

In accordance with this and other exemplary embodiments of the present invention, the cap may be positionable relative to the second portion of the body between an open stage and a closed stage.

In accordance with this and other exemplary embodiments of the present invention, in the open stage the cavity of the specimen end may be exposed by the aperture to an area exterior to the hollow interior chamber.

In accordance with this and other exemplary embodiments of the present invention, the second portion may have a smaller cross-sectional dimensional size than the first portion, and a shoulder may be positioned between the first portion and the second portion.

In accordance with this and other exemplary embodiments of the present invention, wherein the second portion of the body may include first rib extending at least partially around a perimeter of the second portion, and a second rib extending at least partially around the perimeter of the second portion.

In accordance with this and other exemplary embodiments of the present invention, the second portion of the body may include a first rib positioned adjacent to the shoulder and extending at least partially around a perimeter of the second portion, and a second rib positioned adjacent to the specimen end and extending at least partially around the perimeter of the second portion.

In accordance with this and other exemplary embodiments of the present invention, the cap may also include a first groove positioned between the open end and a first side of the aperture and extending at least partially around the hollow interior chamber, and a second groove positioned between the closed end and a second side of the aperture opposite the first side and extending at least partially around the hollow interior chamber.

In accordance with this and other exemplary embodiments of the present invention, the second portion of the body may include a first rib extending at least partially around a perimeter of the second portion, and a second rib extending at least partially around the perimeter of the second portion.

In accordance with this and other exemplary embodiments of the present invention, the first groove may be configured for engagement with the first rib and the second rib, and the second groove may be configured for engagement with the second rib.

In accordance with this and other exemplary embodiments of the present invention, when the first groove is engaged with the second rib, the cap may be positioned in the open stage and the aperture in the cap may be positioned so as to expose the cavity.

In accordance with this and other exemplary embodiments of the present invention, when the first groove is engaged with the first rib and the second groove is engaged with the second rib, the cap may be positioned in the closed stage and the aperture in the cap may be positioned along the second portion of the body.

In accordance with this and other exemplary embodiments of the present invention, as a result of the engagement of the second groove with the second rib, the cavity may be at least substantially sealed within the hollow interior chamber of the cap.

In accordance with this and other exemplary embodiments of the present invention, the vitrification stick may be made from polyester, polyolefin, polyethylene, polypropylene, ethylene-vinyl acetate copolymer, styrene resin, polystyrene, polyamide, or medical grade polystyrene crystal.

In accordance with this and other exemplary embodiments of the present invention, the cap may be made from a transparent material.

In accordance with this and other exemplary embodiments of the present invention, the transparent material may be made from polyester, polyolefin, polyethylene, polypropylene, ethylene-vinyl acetate copolymer, styrene resin, polystyrene, polyamide, or medical grade polystyrene crystal.

In accordance with this and other exemplary embodiments of the present invention, the cavity of the specimen end may be dimensioned to receive and retain a specimen of biological material, such as a human egg or a human embryo, or another animal egg or embryo.

In accordance with an exemplary embodiment of the present invention, a vitrification stick for use in the vitrification and cryopreservation of biological materials is provided that may include a body that may have a first portion and a second portion, a specimen end extending from the second portion of the body, and having a cavity defined therein, and a cap that may include an open end, a closed end, and an aperture.

In accordance with this and other exemplary embodiments of the present invention, the cap may be dimensioned so as to receive at least the specimen end.

In accordance with this and other exemplary embodiments of the present invention, the cap may be positionable relative to the second portion of the body between an open stage and a closed stage.

In accordance with this and other exemplary embodiments of the present invention, in the open stage the cavity of the specimen end may be exposed by the aperture to an area exterior to the cap.

In accordance with this and other exemplary embodiments of the present invention, the second portion of the body may include a first rib extending at least partially around a perimeter of the second portion, and a second rib extending at least partially around the perimeter of the second portion.

In accordance with this and other exemplary embodiments of the present invention, the cap may also include a first groove positioned between the open end and a first side of the aperture, and a second groove positioned between the closed end and a second side of the aperture opposite the first side.

In accordance with this and other exemplary embodiments of the present invention, when the first groove is engaged with the second rib, the cap may be positioned in the open stage and the aperture in the cap may be positioned so as to expose the cavity.

In accordance with this and other exemplary embodiments of the present invention, when the first groove is engaged with the first rib and the second groove is engaged with the second rib, the cap may be positioned in the closed stage and the aperture in the cap may be positioned along the second portion of the body.

In accordance with this and other exemplary embodiments of the present invention, as a result of the engagement of the second groove with the second rib, the cavity may be at least substantially sealed within the hollow interior chamber of the cap.

In accordance with this and other exemplary embodiments of the present invention, the vitrification stick may be made from polyester, polyolefin, polyethylene, polypropylene, ethylene-vinyl acetate copolymer, styrene resin, polystyrene, polyamide, or medical grade polystyrene crystal.

In accordance with this and other exemplary embodiments of the present invention, the cap may be made from a transparent material.

In accordance with this and other exemplary embodiments of the present invention, the transparent material may be made from polyester, polyolefin, polyethylene, polypropylene, ethylene-vinyl acetate copolymer, styrene resin, polystyrene, polyamide, or medical grade polystyrene crystal.

In accordance with this and other exemplary embodiments of the present invention, the cavity of the specimen end may be dimensioned to receive and retain a specimen of biological material, such as a human egg or a human embryo, or another animal egg or embryo.

BRIEF DESCRIPTION OF THE DRAWINGS

For a fuller understanding of the nature and objects of the present invention, reference is made to the following detailed description taken in connection with the accompanying drawings in which:

FIG. 1 is a top plan view of an exemplary vitrification stick in a closed stage according to an aspect of the present invention;

FIG. 2 is a right side view of the exemplary vitrification stick in the closed stage;

FIG. 9 is a top plan view of the exemplary vitrification stick in a separated configuration;

FIG. 10 is a right side view of the exemplary vitrification stick in the separated configuration;

FIG. 17 is an enlarged partial view of the exemplary vitrification stick from FIG. 8.

DETAILED DESCRIPTION

Figure 3:
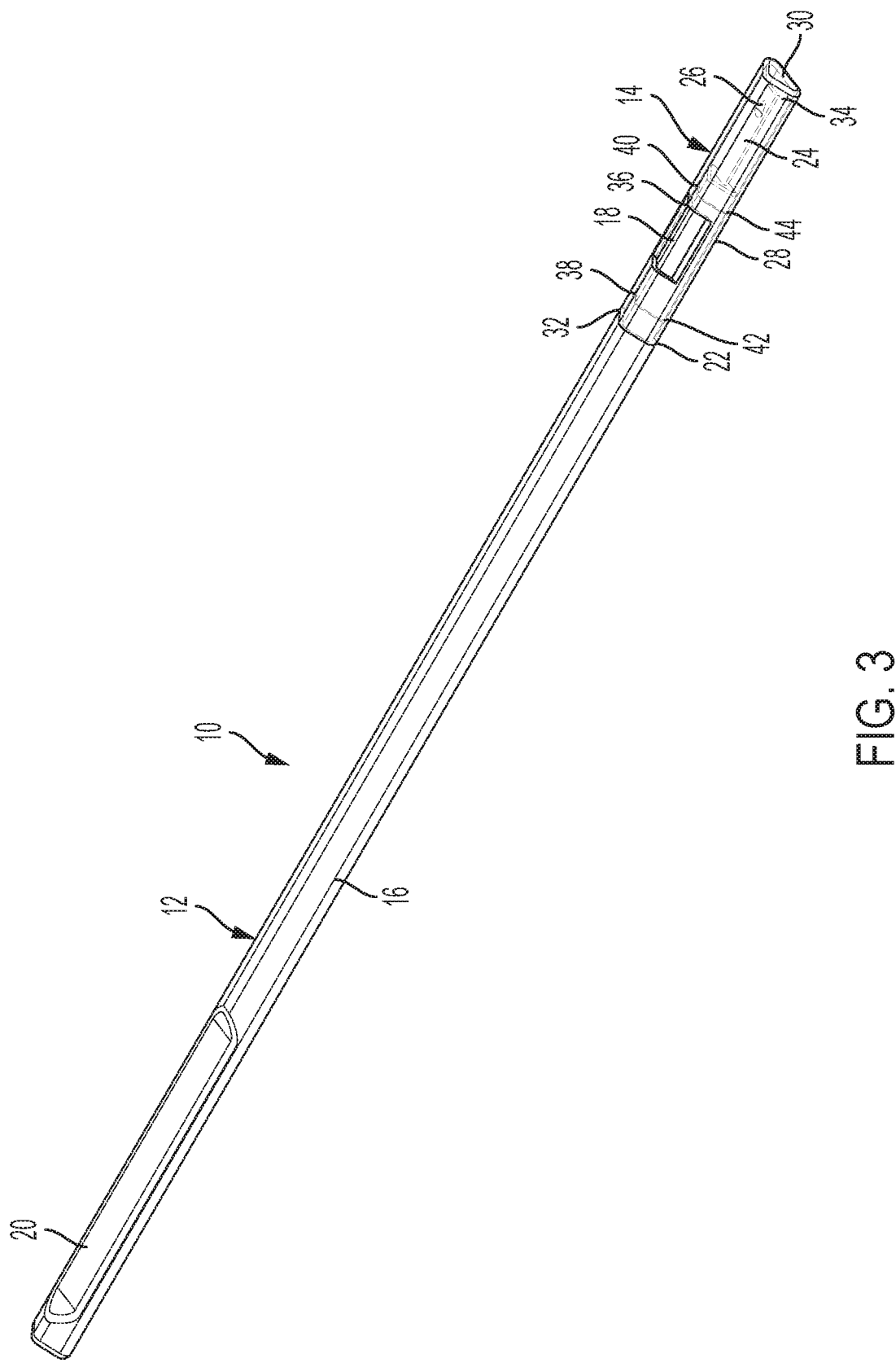
FIG. 3 is a top perspective view of the exemplary vitrification stick in the closed stage.
Figure 4:
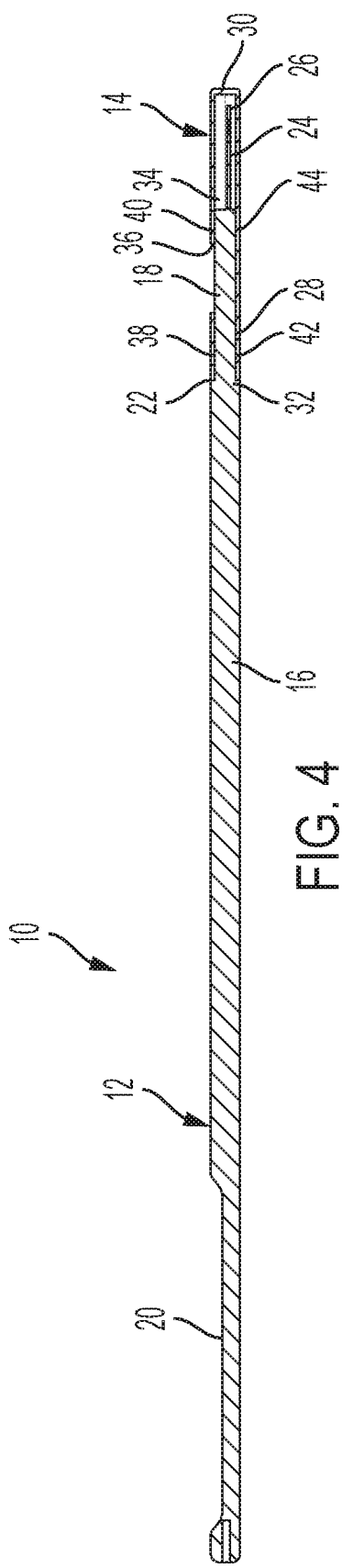
FIG. 4 is cross-sectional view of the exemplary vitrification stick taken along line 4-4 from FIG. 1.
Figure 5:
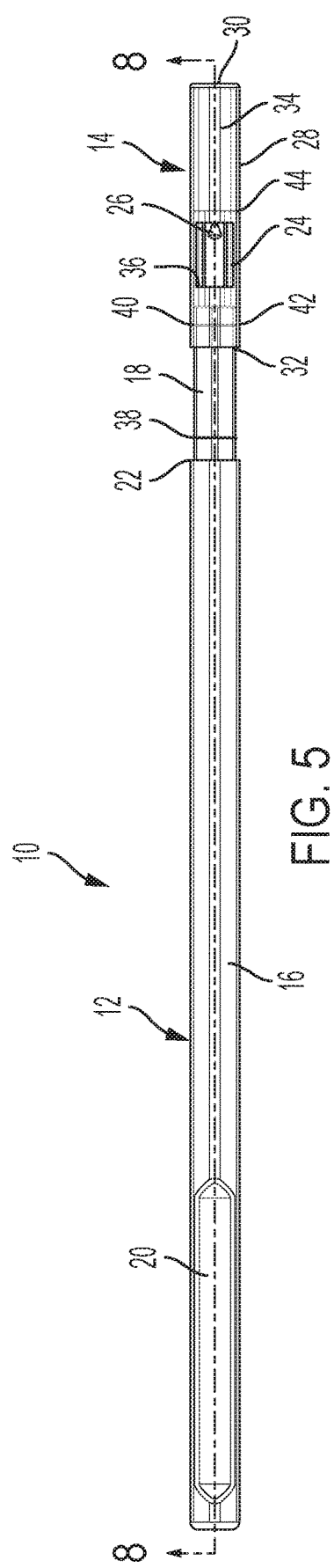
FIG. 5 is a top plan view of the exemplary vitrification stick in an open stage.
Figure 6:
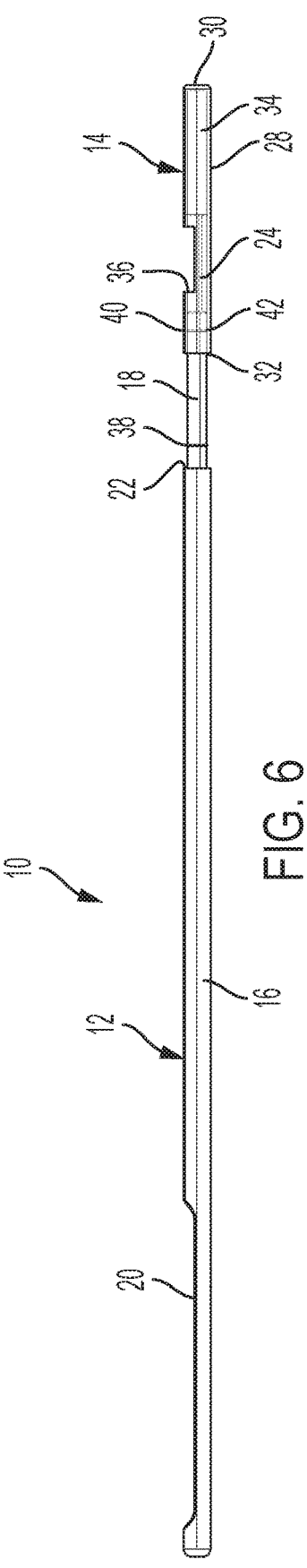
FIG. 6 is a right side view of the exemplary vitrification stick in the open stage.
Figure 7:
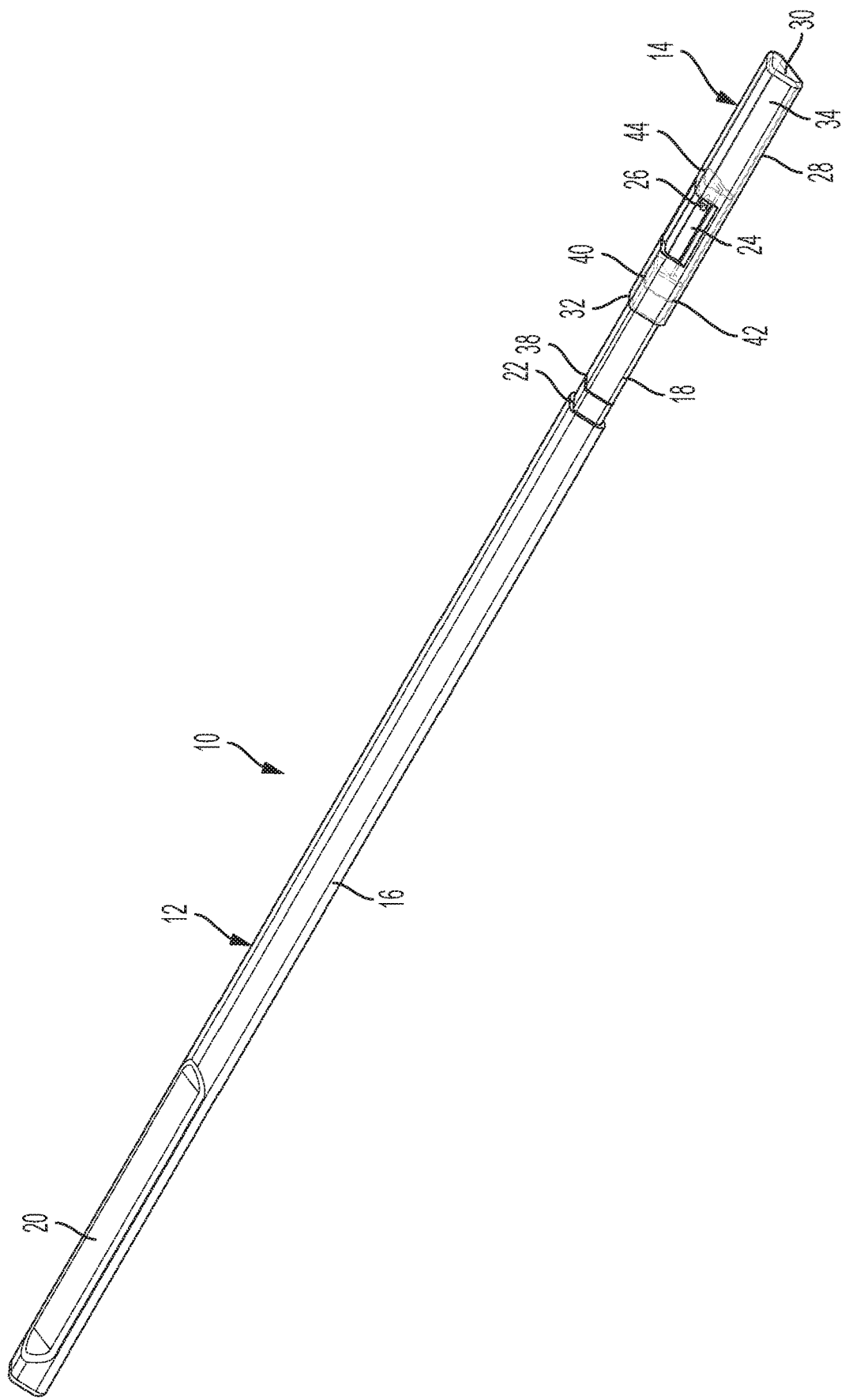
FIG. 7 is a top isometric view the exemplary vitrification stick in the open stage.
Figure 8:
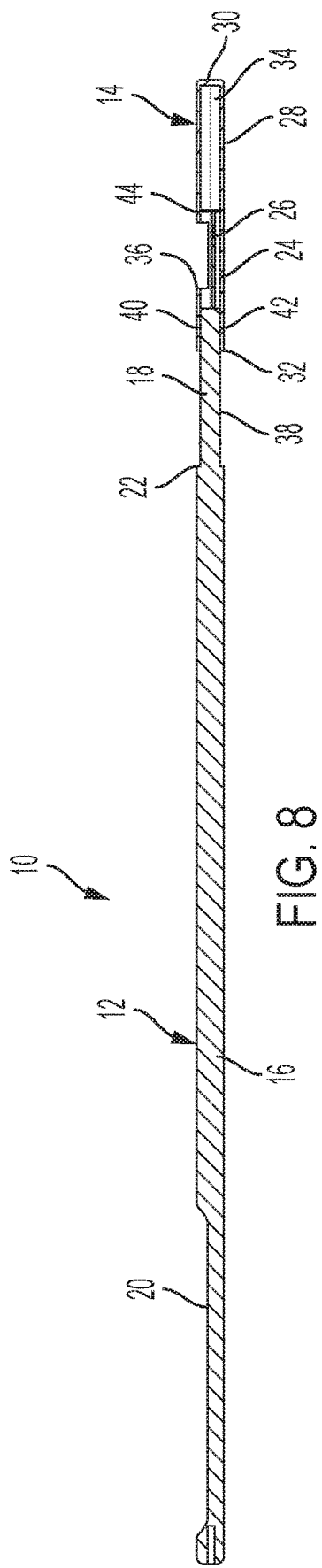
FIG. 8 is a cross-sectional view of the exemplary vitrification stick taken along line 8-8 from FIG. 5.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring now to FIGS. 1-17, therein illustrated is an exemplary embodiment of a vitrification stick, generally referred to by reference numeral 10, for use in the cryopreservation of biological materials. The vitrification stick 10 may include a body 12 and a cap 14 configured for removable engagement with the body 12. The body 12 may have a first portion 16 and a second portion 18, and the second portion 18 may have a smaller cross-sectional dimensional size than the first portion 16. The first portion 16 may include a handle 20, and a shoulder 22 may be positioned between the first portion 16 and the second portion 18, thereby defining the reduction in cross-sectional dimension between the first portion 16 and the second portion 18. The body 12 may have any cross-sectional shape, such as triangular, hexagonal, square, circular, octagonal, or the like, and the first portion 16 and the second portion 18 may have the same cross-sectional shape, or have different cross-sectional shapes. It is understood that if the second portion 18 is to have a smaller cross-sectional dimensional size than the first portion 16 this may also be accomplished through the use of a different cross-sectional shape of the second portion 18 that is cross-sectionally encompassed within the cross-sectional shape of the first portion 16. A specimen end 24 may extend from the second portion 18, and the specimen end 24 may extend from the side of the second portion 18 opposite the side of the second portion 18 from which the first portion 16 extends. The specimen end 24 may have a thin and substantially flexible construction, and may also include a cavity 26 formed therein for receipt and retention of a specimen of biological material (not shown), for example a human egg or embryo, or the egg or embryo of another type of animal.

Still referring to FIGS. 1-17, the cap 14 may include a plurality of walls 28, a closed end 30 and an open end 32 defining a hollow interior chamber 34 of the cap 14. The hollowing interior chamber 34 of the cap 14 may have the same or substantially the same cross-sectional shape and/or dimensional size as the second portion 18 of the body 12, for example, triangular, hexagonal, square, circular, octagonal, or the like. The hollow interior chamber 34 is complementarily sized relative to the second portion 18 so that the cap 14 is dimensioned to receive the specimen end 24 and at least a part of the second portion 18 of the body 12 through the open end 32 of the cap 14. The inner cross-sectional size of the cap 14 may be such that at least a part of the second portion 18 of the body 12 may be slidenly received through the open end 32 and within the hollow interior chamber 34. The cap 14 may also include an aperture 36 formed in one or more of the walls 28 so that the hollow interior chamber 34 is exposed to the exterior area of the cap 14.

Referring now still to FIGS. 1-17, a first rib 38 and a second rib 40 may be positioned around the perimeter of the second portion 18 substantially perpendicular to the longitudinal axis of the body 12. The first rib 38 may be positioned substantially adjacent to the shoulder 22, or if no clearly defined shoulder is present between the first portion 16 and the second portion 18, substantially adjacent to the first portion 16. The second rib 40 may be spaced apart from the first rib 38, and positioned on the second portion 18 closer to the specimen end 24 than the first rib 38. Each of the first rib 38 and the second rib 40 extend from the surface of the perimeter of the second portion 18 so that the first rib 38 and the second rib 40 are at least slightly raised relative to the other surfaces of the second portion 18. In order to allow for cooperation between the first rib 38 and the second rib 40 on the second portion 18 and the cap 14, the cap 14 may include a first groove 42 and a second groove 44 formed in at least a portion of the one or more walls 28 facing the hollow interior chamber 34 of the cap 14. The first groove 42 may be positioned between the aperture 36 and the open end 32 of the cap 14, while the second groove 44 may be positioned between the aperture 36 and the closed end 30 of the cap 14. In this manner, the first groove 42 and the second groove 44 may be positioned on opposite sides of the aperture 36 along the longitudinal axis of the cap 14. The first rib 38 and the second rib 40 are dimensioned and shaped so as to have a meshing relationship with the first groove 42 and the second groove 44. In other words, the first rib 38 and the second rib 40 are configured to be at least substantially complementary with the first groove 42 and the second groove 44. In this manner, as discussed further below, the cap 14 may be positioned in at least two stages when inserted on the body 12 of the vitrification stick 10. It is understood that it is not necessary that the first rib 38 and/or the second rib 40 and/or the first groove 42 and/or the second groove 44 extend completely around or within the second portion 18 and cap 14 respectively as exemplarily illustrated in the discussed figures. The one or more objects of the present invention may still be accomplished with the first rib 38 and/or the second rib 40 and/or the first groove 42 and/or the second groove 44 extending only partially around or within the second portion 18 and cap 14 respectively.

Figure 11:
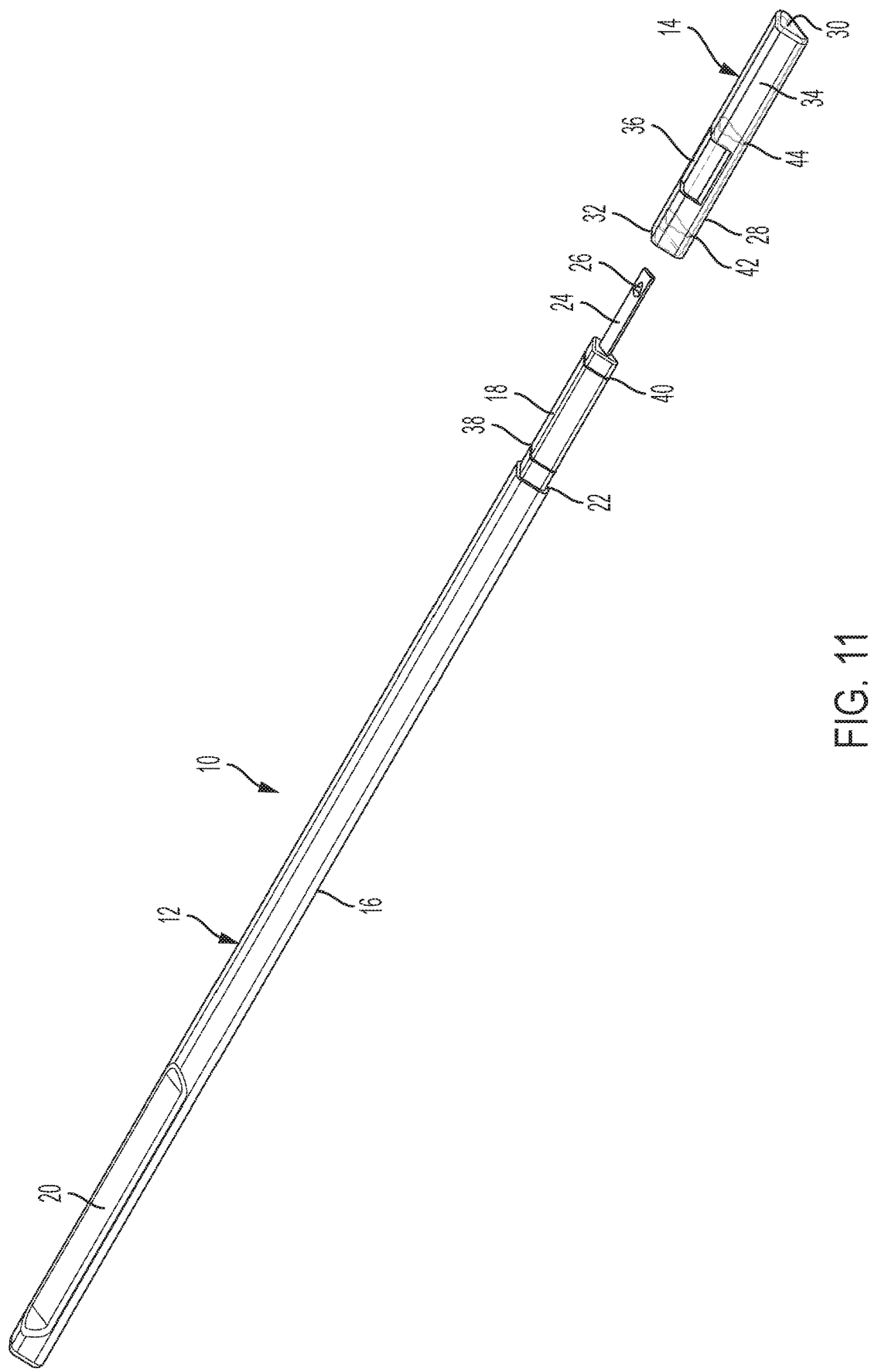
FIG. 11 is a top isometric view the exemplary vitrification stick in the separated configuration.
Figure 12:
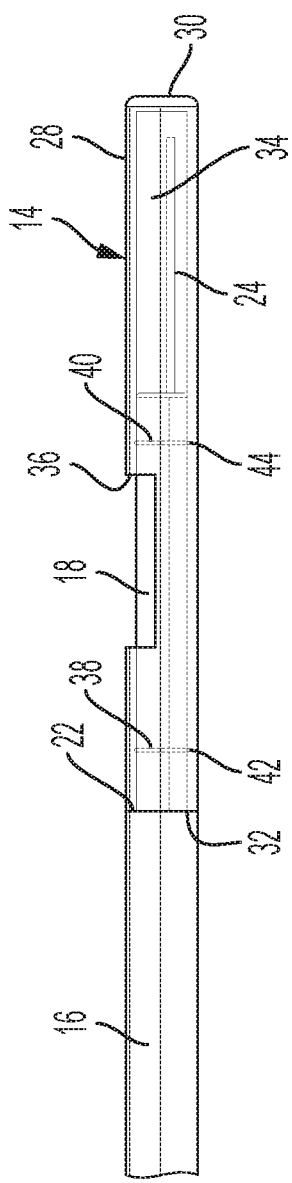
FIG. 12 is an enlarged partial view of the exemplary vitrification stick from FIG. 2.
Figure 13:
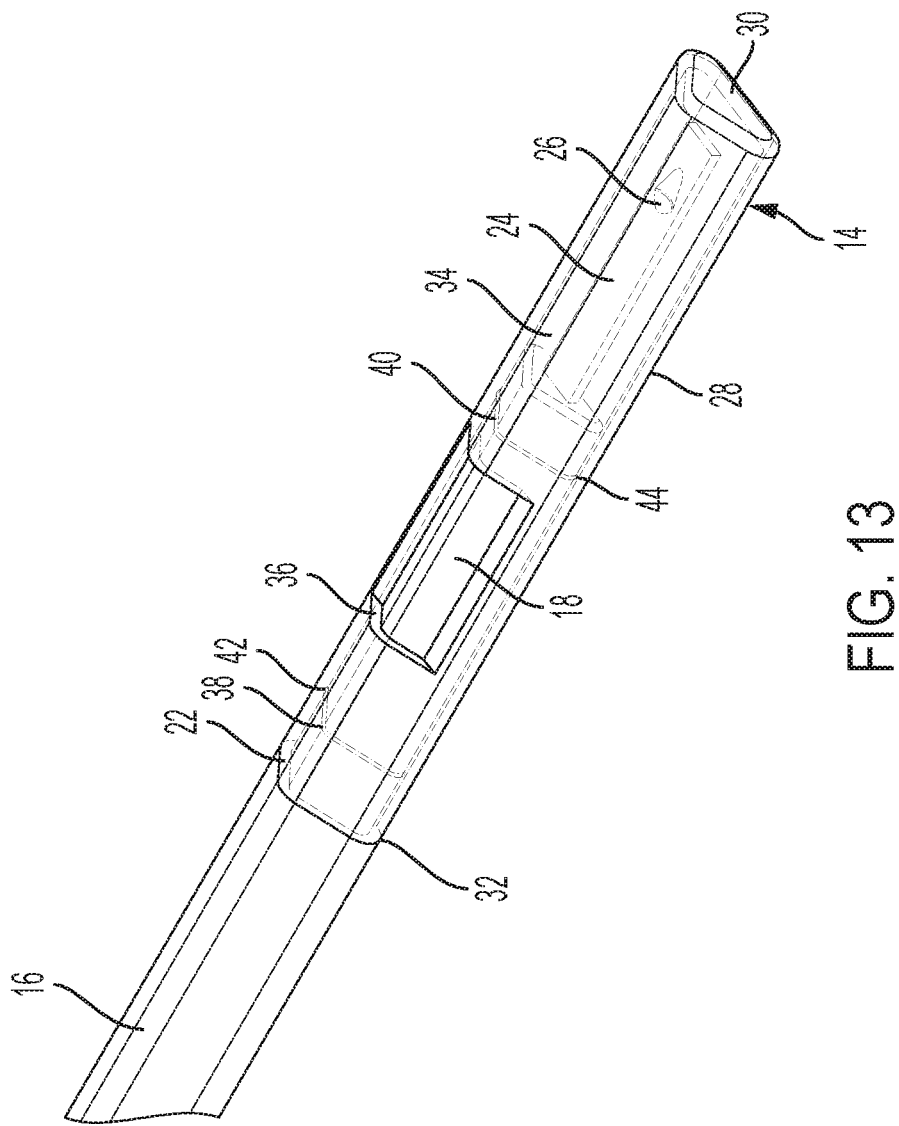
FIG. 13 is an enlarged partial view of the exemplary vitrification stick from FIG. 3.
Figure 14:
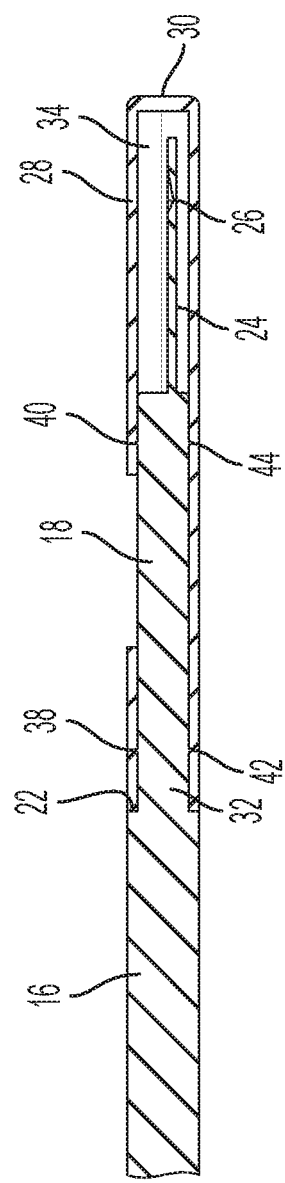
FIG. 14 is an enlarged partial view of the exemplary vitrification stick from FIG. 4.
Figure 15:
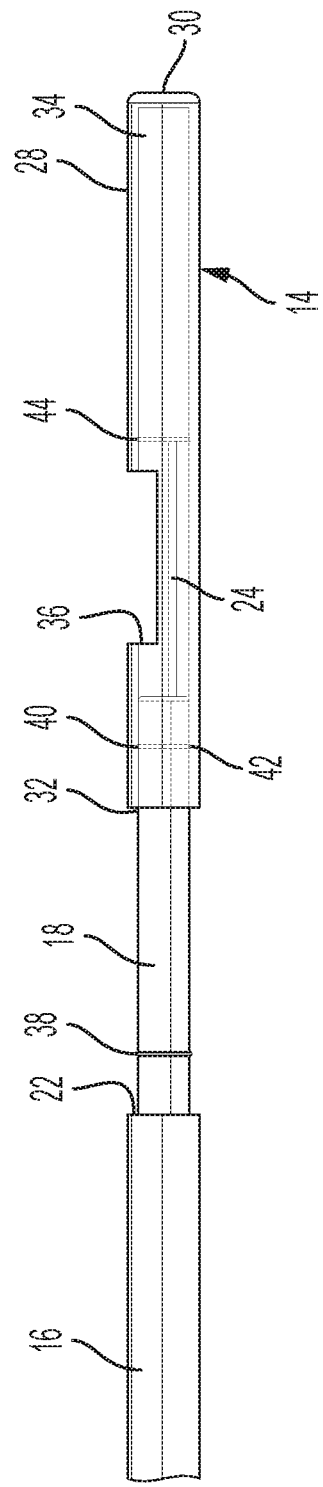
FIG. 15 is an enlarged partial view of the exemplary vitrification stick from FIG. 5.
Figure 16:
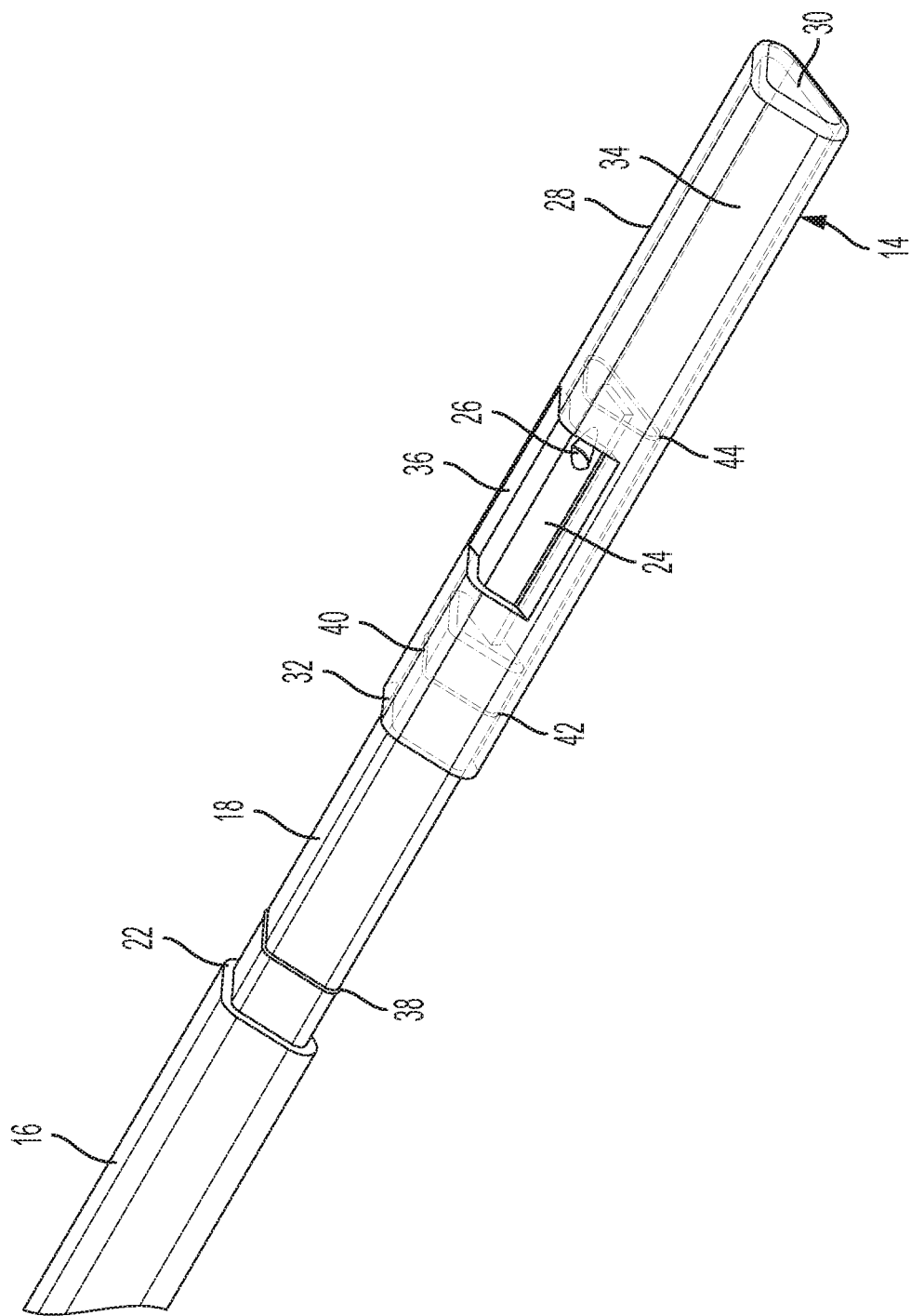
FIG. 16 is an enlarged partial view of the exemplary vitrification stick from FIG. 7.

Referring now to FIGS. 9-11, the cap 14 of the vitrification stick 10 is illustrated in a separated configuration from the body 12. In this separated configuration, the cavity 26 of the specimen end 24 and the second portion 18 are completely exposed, and not enclosed within any portion of the cap 14. As illustrated by FIGS. 5-8 and 15-17, in an open stage of the vitrification stick 10 the cap 14 may be inserted over of the second portion 18 such that the specimen end 24 enters through the open end 32 of the cap 14 and into the hollow interior chamber 34, and the cap 14 at least partially covers a part of the second portion 18. Furthermore, the first groove 42 of the cap 14 has engaged with the second rib 40 of the second portion 18 such that additional force will need to be applied in order to further urge the cap 14 farther onto the second portion 18, or separate the cap 14 from the second portion 18, since the engagement of the first groove 42 with the second rib 40 is sufficient enough to maintain the vitrification stick 10 in the open stage during typical operation and manipulation of the vitrification stick 10. In this open stage, the aperture 36 is positioned relative to the specimen end 24 such that the cavity 26 is exposed to the exterior of the cap 14 through the aperture 36. In the open stage of the vitrification stick 10 a specimen of biological material (not shown) may be deposited on the cavity 26, and then the appropriate cryoprotectants may be applied to the specimen through the opening in the cap 14 provided by the aperture 36. The location of the specimen within the cavity 26 in the open stage of the vitrification stick 10 allows for processing of the specimen for cryopreservation while reducing the risk that the specimen will be inadvertently lost and/or separated from the vitrification stick 10.

As illustrated by FIGS. 1-4 and 12-14, a closed stage of the vitrification stick 10 may be obtained through further urging of the cap 14 towards the shoulder 22 of the body 12 to overcome the mechanism resistance imposed by the engagement of the second rib 40 with the first groove 42, and cause the cap 14 to slide further along the second portion 18. As a result, the first groove 42 will become engaged with the first rib 38, and the second groove 44 will become engaged with the second rib 40. In this closed stage, the cavity 26 of the specimen end 24 is disposed within the hollow interior cavity 34, and separated from the aperture 36 by the mechanical sealing engagement of the second groove 44 with the second rib 40. As a result, the specimen of biological material (not shown) is secured within the hollow interior chamber 34 of the cap 14, and at least substantially within the hollow interior chamber 34 by the cooperating interactions of the first rib 38 with the first groove 32 and the second rib 40 with the second groove 44.

Referring again to FIGS. 1-17, the operation and use of the exemplary vitrification stick 10 according to an aspect of the present invention will be discussed. From the separated configuration, the cap 14 may be placed on the second portion 18 of the body 12, and urged onto the second portion 18 until the first groove 42 engages with the second rib 40 so that the vitrification stick 10 in the open stage. Placement and movement of the cap 14 onto and along the second portion 18 of the body 12 may be facilitated by the corresponding cross-sectional shape and size of the hollow interior chamber 34 of the cap 14 and the second portion 18. The specimen of biological material (not shown) to be cryopreserved, for example a human egg or embryo, may be inserted into the cavity 26 of the specimen end 24 through known techniques, for example through the use of a pipette. One or more cryoprotectants may then be applied to the specimen of biological material through the aperture 36 in the cap 14, which aperture 36 allows for the specimen of biological material to be exposed to the area external to the cap 14. After suitable processing of the specimen of biological material, the cap 14 may be urged further along the second portion 18 in the direction of the first portion 16 of the body 12 until the close stage is reached. In the closed stage the specimen of biological material is retained within the hollow interior cavity 34 of the cap 14, and may be arranged for cryogenic storage.

The body 12 and the cap 14 of the vitrification stick 10 may be made from a suitable rigid material that is non-reactive to any ingredients of the cryoprotectant fluids, and suitable for maintaining its structural integrity at cryogenic temperatures. For example, various polymers, such as polyester, polyolefin, polyethylene, polypropylene, ethylene-vinyl acetate copolymer, styrene resin, polystyrene, polyamide, or medical grade polystyrene crystal may be used for the body and the cap 14. As illustrated by the exemplary embodiment of the vitrification stick 10 shown in FIGS. 1-17, the cap 14 may be constructed of a transparent material. However, it is understood that the cap 14 may also be made from a translucent or opaque material, and may be the same or different transparency as the body 12.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A vitrification stick, comprising:
   a body having a first portion and a second portion,
   a specimen end extending from the second portion of the body, and having a cavity defined therein, and
   a cap comprising an open end and a closed end, and a plurality of walls defining a hollow interior chamber extending between the open end and the closed end, wherein the cap further comprises an aperture formed in at least one of the plurality of walls to the hollow interior chamber, wherein the cap is dimensioned so as to receive the specimen end and at least a part of the second portion of the body,
   wherein the cap is positionable relative to the second portion of the body between an open stage and a closed stage, and
   wherein in the open stage the cavity of the specimen end is exposed by the aperture to an area exterior to the hollow interior chamber.

2. The vitrification stick according to claim 1, wherein the second portion has a smaller cross-sectional dimensional size than the first portion, and a shoulder is positioned between the first portion and the second portion.

3. The vitrification stick according to claim 1, wherein the second portion of the body comprises a first rib extending at least partially around a perimeter of the second portion, and a second rib extending at least partially around the perimeter of the second portion.

4. The vitrification stick according to claim 2, wherein the second portion of the body comprises a first rib positioned adjacent to the shoulder and extending at least partially around a perimeter of the second portion, and a second rib positioned adjacent to the specimen end and extending at least partially around the perimeter of the second portion.

5. The vitrification stick according to claim 1, wherein the cap further comprises a first groove positioned between the open end and a first side of the aperture and extending at least partially around the hollow interior chamber, and a second groove positioned between the closed end and a second side of the aperture opposite the first side and extending at least partially around the hollow interior chamber.

6. The vitrification stick according to claim 5, wherein the second portion of the body comprises a first rib extending at least partially around a perimeter of the second portion, and a second rib extending at least partially around the perimeter of the second portion.

7. The vitrification stick according to claim 6, wherein the first groove is configured for engagement with the first rib and the second rib, and wherein the second groove is configured for engagement with the second rib.

8. The vitrification stick according to claim 6, wherein when the first groove is engaged with the second rib, the cap is positioned in the open stage and the aperture in the cap is positioned so as to expose the cavity.

9. The vitrification stick according to claim 6, wherein when the first groove is engaged with the first rib and the second groove is engaged with the second rib, the cap is positioned in the closed stage and the aperture in the cap is positioned along the second portion of the body.

10. The vitrification stick according to claim 7, wherein as a result of the engagement of the second groove with the second rib, the cavity is sealed within the hollow interior chamber of the cap.

11. The vitrification stick according to claim 1, wherein the vitrification stick is comprised of a material selected from the group consisting of polyester, polyolefin, polyethylene, polypropylene, ethylene-vinyl acetate copolymer, styrene resin, polystyrene, polyamide, and medical grade polystyrene crystal.

12. The vitrification stick according to claim 1, wherein the cap is comprised of a transparent material.

13. The vitrification stick according to claim 12, wherein the transparent material is a polymer.

14. The vitrification stick according to claim 1, wherein the cavity of the specimen end is dimensioned to receive and retain a human egg or a human embryo.

15. A vitrification stick, comprising:
    a body having a first portion and a second portion,
    a specimen end extending from the second portion of the body, and having a cavity defined therein, and
    a cap comprising an open end, a closed end, and an aperture positioned between the open end and the closed end, wherein the cap is dimensioned so as to receive at least the specimen end,
    wherein the cap is positionable relative to the second portion of the body between an open stage and a closed stage, and
    wherein in the open stage the cavity of the specimen end is exposed by the aperture to an area exterior to the cap.

16. The vitrification stick according to claim 15, wherein the second portion of the body comprises a first rib extending at least partially around a perimeter of the second portion, and a second rib extending at least partially around the perimeter of the second portion.

17. The vitrification stick according to claim 16, wherein the cap further comprises a first groove positioned between the open end and a first side of the aperture, and a second groove positioned between the closed end and a second side of the aperture opposite the first side.

18. The vitrification stick according to claim 17, wherein when the first groove is engaged with the second rib, the cap is positioned in the open stage and the aperture in the cap is positioned so as to expose the cavity.

19. The vitrification stick according to claim 17, wherein when the first groove is engaged with the first rib and the second groove is engaged with the second rib, the cap is positioned in the closed stage and the aperture in the cap is positioned along the second portion of the body.

* * * * *